Sept. 30, 1924.  J. F. O'CONNOR  1,510,333
HAND BRAKE
Filed July 12, 1920
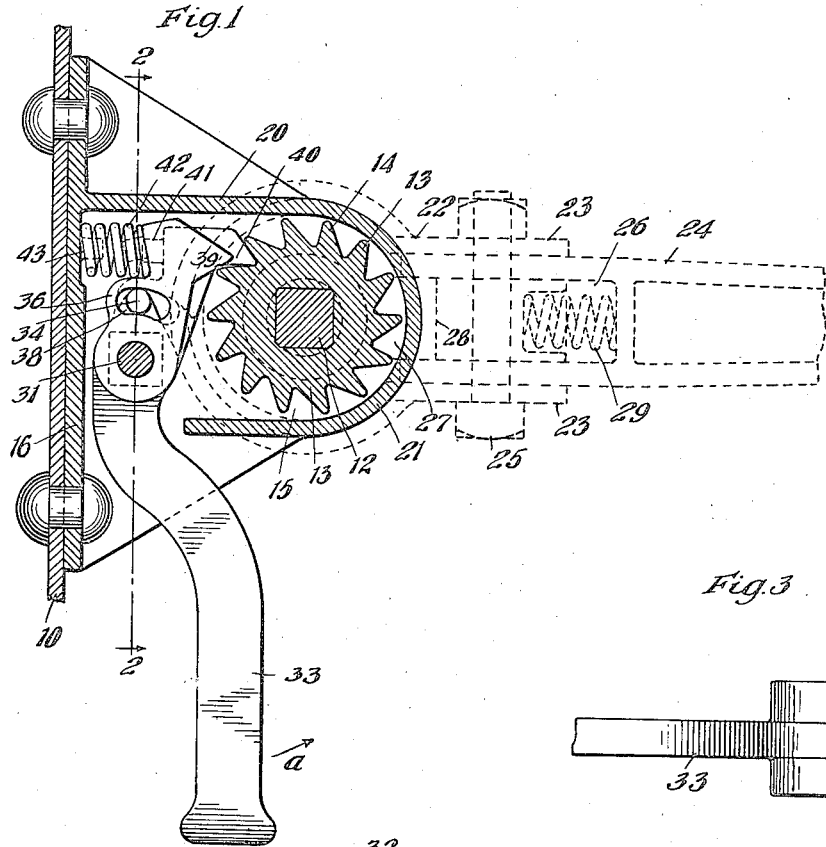
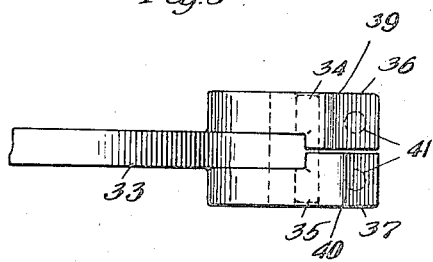
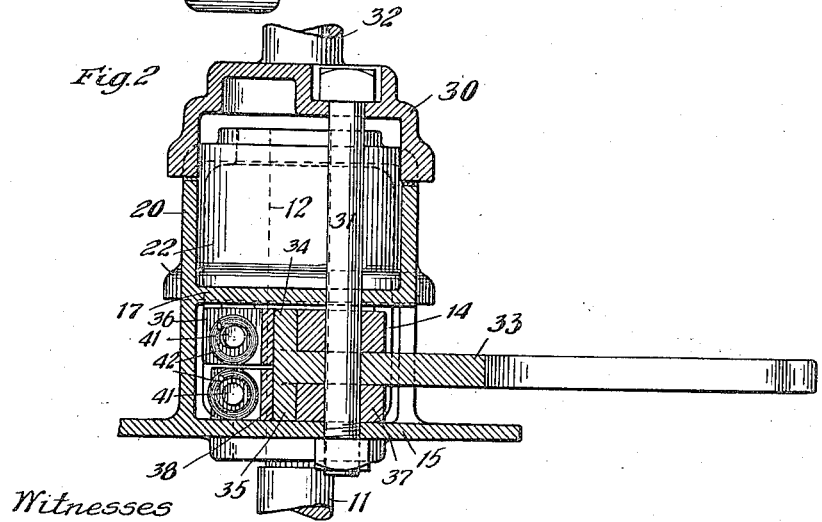
Inventor
John F. O'Connor Patented Sept. 30, 1924.

1,510,333

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

HAND BRAKE.

Application filed July 12, 1920. Serial No. 395,460.

*To all whom it may concern:*

Be it known that I, JOHN F. O'CONNOR, a citizen of United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to improvements in hand brakes.

In the operation of hand brakes for railway cars, employing a pawl and ratcheting mechanism, such as are now coming into extensive use, it has been found that the locking mechanism associated with the pawl and ratcheting devices is not of sufficiently fine adjustment to permit of the brakeman obtaining the best results. As is well known, all the parts of such types of hand brakes must be made of very substantial construction in order to withstand the unusually severe service. As is customary, the ratchet wheels are cast and necessarily the ratchet teeth must be spaced sufficiently to insure the teeth being of strong and substantial construction so as to avoid any tendency of stripping of the ratchet wheel in service. Due to the practical limitations, therefore, which are imposed upon manufacturers in designing the ratchet wheels for the type of brakes in question, it is impossible to reduce the spacing between or the pitch of the ratchet wheel teeth and at the same time be able to manufacture them successfully on a commercial basis. In the actual operation of the brakes, during the taking up of the slack in the brake chain, no difficulty is experienced by the brakeman. During the early part of the actual tensioning of the brake chain, the brakeman has no difficulty in rotating the usual brake staff or its equivalent so as to have the locking dog catch in a tooth. Actual tests have demonstrated that, after the slack has been taken out of the chain, the brakeman can run the tension on the brake chain to about five or six hundred pounds with two or three ordinary oscillating movements of the operating member, the tension increasing however in practically a geometrical ratio for each additional oscillation instead of arithmetically. After the tension on the brake chain has reached six or seven hundred pounds, the additional tension exerted on the brake chain resulting from an advancement of the staff or its equivalent an amount corresponding to one tooth of the ratchet wheel increases with extreme rapidity and after the tension has reached seven hundred pounds, it requires from four to five hundred pounds additional to advance the staff an amount corresponding to one tooth of the ratchet wheel. It is obvious that the brakeman may not be able to advance the staff an additional notch without exerting extreme effort while at the same time he is able to advance the staff an amount corresponding to a part of the pitch of the ratchet wheel teeth without unduly exerting himself. In other words, under present actual conditions, the brakeman may ordinarily exert a tension on the brake chain of say seven hundred pounds but cannot advance the staff or its equivalent sufficiently to engage the locking dog with the next notch on the ratchet wheel since this would involve some five or six hundred pounds additional tension on the brake chain. If, therefore, the brakeman is enabled to advance the staff so as to obtain a tension of nine or ten hundred pounds on the brake chain, without unduly exerting himself, the efficiency of the brake would manifestly be greatly increased.

One object of my invention is to provide a simple arrangement by which a more finely graduated engagement of the locking means is obtained for hand brakes of the ratcheting wheel type than heretofore and in such a way as not to militate against the cost of manufacture or strength of the brake as an entirety.

Other objects of the invention will more clearly appear from the description hereinafter following.

In the drawing forming a part of this specification, Figure 1 is a horizontal sectional view of a portion of a hand brake shown as applied to the end wall of a car and embodying my improvements. Figure 2 is a vertical sectional view of the structure illustrated in Figure 1 and corresponding substantially to the line 2—2 thereof. And Figure 3 is a front elevational view of the improved locking dog employed with my construction.

In said drawing, 10 indicates a portion of the end wall of a freight car to which my improved brake is adapted to be secured. In carrying out my invention, as shown in the drawing, a vertical brake staff 11 is employed, the upper end thereof being squared as indicated at 12 and upon which is adapted to be applied a ratchet wheel 13 having ratchet teeth 14. The staff extends through a suitable opening in the bottom wall 15 of a bracket 16 which is secured to the car wall 10. Said bracket 16 has a horizontally extending flange 17 and a vertically arranged flange 20 forming a part of the housing, the flange 20 having a curved portion indicated at 21. A carrier 22 is oscillatably mounted on the ratchet wheel 13 and the housing, said carrier being provided with a pair of laterally extended spaced arms 23 between which is pivotally mounted the operating handle 24 on the bolt 25. The handle 24 is provided with a socket indicated at 26 and in which is slidable a double-toothed pawl 27. The pawl has an elongated slot 28 through which the bolt 25 passes so as to adapt the pawl for back and forth sliding movement. It is normally held in its outermost position by a spring 29. The housing is completed by a cap plate 30, the parts being held in assembled relation by the bolt 31. The cap plate 30 may be provided with an upwardly projecting handle 32 for the convenience of the brakeman while operating the brake.

In order to provide for the fine adjustment in the locking of the ratchet wheel and staff, I employ the following construction. Pivotally mounted on the bolt 31 is a release lever 33, the same having upwardly and downwardly projecting pins 34 and 35 at its inner end as shown in Figures 2 and 3. Also pivotally mounted on the bolt 31 is an upper toothed dog 36 and a lower toothed dog 37. In addition to being pivotally mounted on the bolt 31, the dogs 36 and 37 are provided with arcuate slots 38 within which extend the pins 34 and 35. Each dog 36 and 37 has a single tooth indicated at 39 and 40 respectively. On their rear or outer sides, the dogs 36 and 37 are provided with studs 41—41 on which are mounted springs 42—42, the outer ends of the springs seating over correspondingly arranged studs 43—43.

As clearly appears from Figure 1, the slots 38 in the dogs 36 and 37 are sufficiently elongated to permit the dog teeth to ride over the teeth 14 of the ratchet wheel without effecting movement of the release handle although it will be evident that movement of the release handle in the direction indicated by the arrow $a$ in Figure 1 will positively disengage both dogs simultaneously from the ratchet wheel against the normal action of the springs 42. As also appears from Figures 1 and 3, the tooth 39 is located in advance of the tooth 40 a distance corresponding preferably to one-half the pitch or distance between the centers of the ratchet wheel teeth 14. With this arrangement, I am enabled to catch or lock the ratchet wheel at twice as many points and at half the distance apart as would be possible with a single locking dog cooperable with the ratchet wheel having teeth of the same pitch. The release is of course effected in the usual manner.

With the construction described in the foregoing, I am enabled to obtain the final locking adjustment heretofore referred to and all the attendant advantages indicated and without in any wise weakening the strength of the ratchet wheel. Furthermore, by employing the more finely graduated adjustment for locking the ratchet wheel, I eliminate an appreciable part of the lost motion normally incident to the operation of a brake even before the tension on the brake chain rises to such a point as to render it difficult for the brakeman to advance the ratchet wheel a full notch and in this way increase the speed with which the brake may be applied as well as increasing the efficiency and effectiveness of the tension which may be applied to the usual brake chain.

I have herein shown and described what I now consider the preferred manner of carrying out the invention but the same is merely illustrative of one embodiment thereof and all changes and modifications are contemplated that come within the scope of the claims appended hereto.

I claim:

1. In a hand brake mechanism for railway cars, the combination with a supporting bracket; of a rotatable chain-tightening element and means for effecting step by step rotation thereof; a ratchet wheel; a pair of independently operable locking dogs pivotally supported on said bracket and spring-influenced to operative position with respect to said ratchet wheel, the operative portions of said locking dogs being circumferentially offset with respect to the ratchet wheel; and a release lever pivotally mounted on said bracket at the same point of pivotal mounting of said locking dogs, said release lever having means engageable with both of said dogs to move the latter simultaneously to an inoperative position.

2. In a hand brake mechanism including a ratchet wheel and pawl operating means cooperable therewith, the combination with a plurality of independently acting, spring-controlled pivoted locking dogs cooperable with said ratchet wheel, the teeth of said locking dogs being relatively offset circumferentially of the ratchet wheel a distance different from the full tooth pitch of the ratchet wheel or multiple thereof; of a pivoted release lever having oppositely extending pins engaging in openings in said dogs for moving the latter to inoperative position.

3. In a hand brake mechanism, including a vertical brake staff, a ratchet wheel thereon, and a combined pawl and operating handle, the combination with a pair of independently acting, pivotally mounted, spring controlled locking dogs arranged to cooperate with said ratchet wheel, each locking dog having a tooth, said teeth being relatively offset from each other circumferentially of the ratchet wheel a distance different from a multiple of a full tooth pitch; of a pivoted release lever having a lost motion connection between itself and each of said dogs for simultaneously disengaging said dogs from the ratchet wheel against the influence of said spring control.

4. In a hand brake, including a ratchet wheel and pawl operating means cooperable therewith; the combination with a plurality of independently acting spring-controlled locking dogs cooperable with said ratchet wheel, the teeth of said locking dogs being relatively offset circumferentially of the ratchet wheel a distance different from the full tooth pitch of the ratchet wheel, or multiple thereof; of a release lever having slot and pin connections with said dogs for moving the latter to inoperative position.

In witness that I claim the foregoing I have hereunto subscribed my name this 21st day of June, 1920.

JOHN F. O'CONNOR.

Witnesses:
CARRIE GAILING,
UNA C. GRIGSBY.